United States Patent [19]

Just et al.

[11] Patent Number: 4,772,666

[45] Date of Patent: Sep. 20, 1988

[54] CURABLE MIXTURES AND THEIR USE

[75] Inventors: Christoph Just, Niedernhausen; Helmut Dürr; Gerhard Brindöpke, both of Frankfurt am Main, all of Fed. Rep. of Germany

[73] Assignee: Hoechst Aktiengesellschaft, Fed. Rep. of Germany

[21] Appl. No.: 136,869

[22] Filed: Dec. 22, 1987

[30] Foreign Application Priority Data

Dec. 24, 1986 [DE] Fed. Rep. of Germany ....... 3644372

[51] Int. Cl.$^4$ .............................................. C08G 18/06
[52] U.S. Cl. ...................................... 525/185; 528/45; 528/65; 528/66; 528/73
[58] Field of Search ..................... 525/185; 528/45, 65, 528/66, 73

[56] References Cited

U.S. PATENT DOCUMENTS 4,496,684  1/1985  O'Connor et al. .................. 524/591

*Primary Examiner*—Maurice J. Welsh
*Attorney, Agent, or Firm*—Bierman and Muserlian

[57] ABSTRACT

Curable mixtures based on
(A) compounds containing 1,3-dioxolan-2-one groups, groups capable of reaction with isocyanate groups and, if appropriate, further groups,
(B) polyisocyanates and/or aminoplast resins and
(C) if appropriate, further curing compounds.

The coatings obtainable from these mixtures are distinguished above all by rapid curing and by good solvent stability and good adhesive power.

19 Claims, No Drawings

CURABLE MIXTURES AND THEIR USE

It is known to cure polymers containing hydroxyl groups, such as polyacrylic compounds, by means of unblocked or blocked polyisocyanates. However, these systems no longer cure dry fast enough for present demands. Moreover, the adhesion to substrates and the pigment absorption capacity are frequently unsatisfactory. Resistance to organic liquids, such as premium gasoline, is reached only at relatively high hydroxyl functionalities or degrees of crosslinking, i.e. relatively large quantities of relatively expensive and physiologically not harmless polyisocyanates must be used. Finally, the (poly)amino compounds, which are formed by partial hydrolysis of the polyisocyanates due to the atmospheric humidity, in most cases adversely affect the properties of the cured systems, such as weathering resistance and light stability.

European Published Application No. 1,088 discloses polymers which contain 1,3-dioxolan-2-one groups and can also be used in the coating sector. Questions of the drying rate and solvent resistance are not mentioned in this printed publication.

It was the object of the invention to provide curable mixtures which, with regard to the individual disadvantages listed above or at least with regard to their combination, achieve an improvement.

It has now been found that this object can, surprisingly, be achieved by curable mixtures based on (A) compounds containing 1,3-dioxolan-2-one groups, groups capable of reacting with isocyanate groups and, if appropriate, further groups, (B) polyisocyanates and/or aminoplast resins, preferably melamine resins, and (C) if appropriate, further curing compounds.

The invention also relates to the use of these curable mixtures, in particular for the production of moldings and coatings and as a constituent in finishes or adhesives.

Component (A) of the mixtures according to the invention contains structural units derived from (a) an olefinically unsaturated monomer, containing 1,3-dioxolan-2-one groups, in quantities from 3 to 95% by weight, preferably 5 to 70% by weight and especially 5 to 20% by weight, relative to the total component (A), (b) an olefinically unsaturated monomer, which is copolymerizable with (a) and contains groups, preferably OH groups, capable of reacting with isocyanate groups, in quantities from 95 to 7% by weight, preferably 95 to 30% by weight and especially 4 to 50% by weight, relative to (A), and, if appropriate, (c) one or more other olefinically unsaturated monomers, which are copolymerizable with (a) and (b), in quantities of up to 90% by weight, preferably up to 60% by weight and especially up to 40% by weight, relative to (A).

The structural units according to (a) are preferably distributed at random along the molecule chain of (A), the term "random" being intended also to include a block distribution. The functionality of 1,3-dioxolan-2-one groups in (A) is in general 15 to 500 mmol/100 g of (A), preferably 25 to 400 mmol/100 g of (A).

Preferably, the monomers according to (a) are those of the general formula

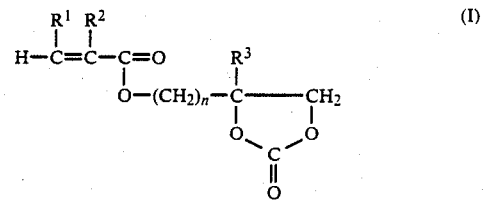

In this formula, n is an integer from 1 to 6, preferably 1, $R^1$ is H, alkyl having preferably 1 to 10 and especially 1 to 6 carbon atoms and can be linear, branched or cyclic, or is COOR' (R'=H or alkyl as above), $R^2$ is, independently of $R^1$, H or alkyl as indicated above and $R^3$ is H, methyl or ethyl. Examples of typical representatives thereof are (2-oxo-1,3-dioxolan-4-yl)-methyl acrylate, (2-oxo-1,3-dioxolan-4-yl)-methyl (meth)acrylate, (2-oxo-1,3-dioxolan-4-yl)-methyl itaconate and (2-oxo-1,3-dioxolan-4-yl)-methyl maleate.

The monomers according to (b) are preferably esters, containing hydroxyl groups, of olefinically unsaturated mono- or di-carboxylic acids having 1 to 8 and preferably 2 or 3 carbon atoms in the alcohol radical, examples of possible acids being acrylic and methacrylic acid (=(meth)acrylic acid), crotonic acid, fumaric acid, maleic acid, itaconic acid, sorbic acid or unsaturated fatty acids having 8 to 22 carbon atoms. (Meth)acrylic acid is here preferred. Examples thereof are esters of these acids with ethylene glycol, 1,2- or 1,3-propylene glycol, 1,4-butylene glycol, trimethylolpropane, glycerol and the like; moreover reaction products of these acids with terminal epoxides such as, for example, hexene oxide or dodecene oxide, as well as reaction products of these acids with glycidyl esters, preferably of saturated aliphatic α-branched mono-carboxylic acids having 8 to 14 carbon atoms, such as, for example, ®Cardura E 10 (glycidyl ester of "Versatic acid"). If corresponding esters of unsaturated dicarboxylic acids are used, these should contain only one C=C double bond. Hydroxyethyl (meth)acrylate is particularly preferred.

The monomers according to (c) are, for example, those indicated below, preferably at least one of these monomers being employed:

(c1) vinylaromatic hydrocarbons such as, preferably, styrene or substituted styrenes, such as α-methylstyrene, p-chlorostyrene and vinyltoluenes such as p-methylstyrene, in quantities from 0 to 70% by weight, preferably 10 to 60% by weight, relative to (A);

(c2) esters, amides or nitriles of olefinically unsaturated mono- or di-carboxylic acids in quantities from 0 to 50% by weight, preferably 5 to 40% by weight, relative to (A). The esters are here preferred. The acids are the same as those mentioned above under (b). The alcohol component in the esters contains in general 1 to 18 and preferably 1 to 13 carbon atoms. Examples of these are: methyl, ethyl, butyl, 2-ethylhexyl, lauryl or stearyl esters of (meth)acrylic acid. Fatty alcohols, cyclic alcohols, monoalkyl ethers of ethylene glycols or propylene glycols and versatic alcohols are also suitable as the alcohol component.

Amides of these acids are here to be understood especially as those of the type —CONR"R"', wherein R" is H, alkyl having preferably 1 to 6 carbon atoms or $(RO)_nX$ ($R=a(C_1-C_6)$-alkylene group which may contain hydroxyl groups, and $n=1$ to 10, X=H or ($C_1-C_6$)-alkyl) and R"', independently thereof, is H or alkyl having preferably 1 to 6 carbon atoms. (Meth)acrylic acid amide, N-methylol-(meth)acrylamide and corresponding ethers such as N-methylol(meth)acrylamide methyl or butyl ether and dialkylaminoethyl-(meth)acrylamide may be mentioned here.

As a nitrile, (meth)acrylonitrile may be mentioned as an example;

(c3) esters, capable of addition, of saturated aliphatic monocarboxylic acids, preferably branched in the α-position, in quantities from 0 to 30% by weight, preferably 0 to 20% by weight, relative to (A); examples of these are glycidyl esters of appropriate acids having 8 to 14 carbon atoms, especially α-monoalkanecarboxylic acids or α-dialkanemonocarboxylic acids, such as the so-called "Versatic acids";

(c4) olefinically unsaturated mono- or di-carboxylic acids in quantities from 0 to 30% by weight, preferably 0 to 15% by weight, relative to (A), and, in the presence of (c3), at least an equivalent quantity of this component (c4) being present; the acids in this case are above all those mentioned under (b), and also half-esters of unsaturated dicarboxylic acids, the alcohol component of which corresponds to the esters mentioned under (c2);

(c5) glycidyl esters of olefinically unsaturated mono- or di-carboxylic acids in quantities from 0 to 40% by weight, preferably 0 to 30% by weight. The comments under (c4) above again apply to the acids; a preferred representative here is glycidyl (meth)acrylate;

(c6) unsaturated esters of a saturated monocarboxylic acid, preferably branched in the α-position, in quantities from 0 to 30% by weight, preferably 0 to 20% by weight. Examples thereof are vinyl esters of corresponding acids having 2 to 20 and preferably 2 to 14 carbon atoms, such as vinyl acetate, vinyl propionate, the vinyl ester of Versatic acid and vinyl linoleate;

(c7) vinyl compounds (other than vinyl esters) such as vinyl ethers, for example methyl vinyl ether, ethyl vinyl ether or allyl glycidyl ether, and N-vinylpyrrolidone, in quantities from 0 to 30% by weight, preferably 0 to 20% by weight, relative to (A).

In special cases, structural units can also additionally be present in (A), which are derived from olefins, such as ethylene or propylene, or from monomers having urethane groups, which are obtained, for example, by reacting vinyl isocyanate with conventional blocking agents.

With respect to the monomers according to (a), (b) and (c1) to (c7) as well as those mentioned above, mixtures within the individual groups can also be used in each case. Preferably, component (A) contains, in addition to structural units (a) and (b), also those according to (c1) and/or (c2). Typical representatives of (A) have the following composition:

(2-oxo-1,3-dioxolan-4-yl)-methyl (meth)acrylate/2-hydroxyethyl (meth)acrylate/butyl (meth)acrylate/ethylhexyl (meth)acrylate;

(2-oxo-1,3-dioxolan-4-yl)-methyl (meth)acrylate/2-hydroxyethyl (meth)acrylate/butyl (meth)acrylate/ethylhexyl (meth)acrylate/styrene;

(2-oxo-1,3-dioxolan-4-yl)-methyl itaconate/2-hydroxyethyl (meth)acrylate/butyl (meth)acrylate/ethylhexyl (meth)acrylate;

(2-oxo-1,3-dioxolan-4-yl)-methyl maleate/2-hydroxyethyl (meth)acrylate/butyl (meth)acrylate/ethylhexyl (meth)acrylate;

(2-oxo-1,3-dioxolan-4-yl)-methyl (meth)acrylate/2-hydroxyethyl (meth)acrylate/methyl (meth)acrylate/styrene;

(2-oxo-1,3-dioxolan-4-yl)-methyl acrylate/1,4-butanediol monoacrylate/2-ethylhexyl acrylate/styrene;

(2-oxo-1,3-dioxolan-4-yl)-methyl methacrylate/2-hydroxypropyl methacrylate/methyl methacrylate/styrene;

(2-oxo-1,3-dioxolan-4-yl)-methyl methacrylate/lauryl methacrylate/2-ethoxyethyl methacrylate/styrene;

(2-oxo-1,3-dioxolan-4-yl)-methyl methacrylate/reaction product of "Cadura" E 10 and acrylic acid/styrene/methyl methacrylate/hydroxyethyl methacrylate;

(2-oxo-1,3-dioxolan-4-yl)-methyl methacrylate/2-methoxyethyl acrylate/2-hydroxypropyl acrylate/n-butyl methacrylate/styrene; and (2-oxo-1,3-dioxolan-4-yl)-methyl methacrylate/n-butyl acrylate/t-butyl acrylate/methyl methacrylate/hydroxyethyl methacrylate.

The molecular weight $\overline{M}_W$ (weight average) of (A), determined by means of gel chromatography (polystyrene standard), is in general between 1,000 and 50,000, preferably between 3,000 and 30,000. If component (A) contains OH groups as the groups reactive with isocyanate groups, the OH number is in most cases 20 to 200, preferably 45 to 180 and especially 50 to 150. The acid numbers are—if monomers containing carboxyl groups are used at all—in general below 15 and preferably below 9.

Component (A) can be prepared in such a way that corresponding oligomers or polymers, which contain a sufficient number of randomly distributed glycidyl (epoxide) groups, are reacted in the known manner with $CO_2$ in the presence of a catalyst. All or a part of the glycidyl (epoxide) groups are thus converted into 1,3-dioxolan-2-one groups. Processes of this type are described, for example, in PCT(WO) Patent Application No. 84/03,701 and in German Patent Applications Nos. P 3,529,263.6 and P 3,600,602.5. Their disclosure, including the preferred embodiments, is incorporated herein by reference.

Preferably, however, component (A) according to the invention is prepared by copolymerization of the monomers according to (a) and (b) as well as, if appropriate, (c).

The monomers according to (a), preferably those of the formula (I), can here in turn be obtained by adding $CO_2$ to the corresponding glycidyl esters of unsaturated carboxylic acids, such as (meth)acrylic acid, maleic acid, fumaric acid and the like, according to the literature references quoted above.

The copolymerization is carried out in the known manner, preferably by the free-radical chain mechanism and according to the conventional methods of bulk polymerization, solution polymerization, precipitation polymerization, dispersion polymerization, emulsion polymerization or bead polymerization. Bulk polymerization, solution polymerization or emulsion polymerization and especially bulk polymerization or solution polymerization are preferred.

Examples of suitable free-radical initiators are aliphatic azo compounds such as azoisobutyronitrile, peroxides such as diacyl peroxides, for example dibenzoyl peroxide, dialkyl peroxides, such as di-tert.-butyl peroxide, or dialkyl hydroperoxides such as tert.-butyl hydroperoxide. Di-tert.-butyl peroxide is particularly preferred. Their proportion is in general 0.5 to 4.0% by weight, preferably 1 to 3% by weight, relative to the total weight of the starting components.

The initiator can be gradually metered in together with the monomers. For example in the case of bulk polymerization, a part of the initiator can also be metered into the substances already introduced.

In certain cases, it can be desirable also to add other agents (regulators) which modify the chain length, such as mercaptans, dimerized α-methylstyrene and similar compounds, to the polymerization mixture. In general, 0.1 to 4.0% by weight, preferably 1 to 2% by weight, relative to the total quantity of monomers, of these compounds are used.

If the copolymerization is carried out in bulk, a monomer which does not tend to homopolymerization, such as a maleate or the compounds mentioned under (c3), is preferably employed, the polymerizable ester being formed from the latter only during the polymerization. If the polymerization is carried out in solution, the conventional organic solvents inert under the polymerization conditions can be used for this purpose, such as, for example, halogenated hydrocarbons, ethers, such as diethyl ether, dimethyl diglycol, tetrahydrofuran or dioxane, ketones such as, for example, methyl ethyl ketone, acetone, cyclohexanone and the like, esters such as butyl acetate, ethylglycol acetate, methylglycol acetate and methoxypropyl acetate, aliphatic or aromatic hydrocarbons such as hexane, heptane, cyclohexane, benzene, xylene, toluene and aromatic solvents in the boiling range from about 150° to 180° C., (®Solvesso). The solvents can here by used individually or as a mixture, the latter especially if the solvent power of the individual solvent should be inadequate, since its polarity is under some circumstances too low.

The copolymerization can be carried out within a wide temperature range from about 20° to 250° C., preferably 60° to 180° C., with reaction times of 3 to 10 hours, preferably 5 to 8 hours. Usually, normal pressure is applied, but higher pressures can be of advantage in some cases.

Component (B) according to the invention is composed of polyisocyanates and/or of aminoplast resins, preferably melamine resins.

The polyisocyanates can here be used in the unblocked form or also in the partially or fully blocked form, the unblocked polyisocyanates being preferred.

Suitable unblocked polyisocyanates are the compounds known from polyurethane chemistry, such as aliphatic, cycloaliphatic or aromatic polyisocyanates or corresponding prepolymers.

Examples of such polyisocyanates are aliphatic trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate and butylidene diisocyanate, 2,2,4-trimethylhexamethylene diisocyanate and 1,12-dodecane diisocyanate, dicycloalkylene diisocyanates such as 1,3-cyclopentane diisocyanate, 1,4-cyclopentane diisocyanate and 1,2-, 1,3- and 1,4-cyclohexane diisocyanates as well as isophorone diisocyanate (IPDI), and also diisocyanates of dimeric acids, aromatic diisocyanates such as 1,3-phenylene diisocyanate, 1,4-phenylene diisocyanate, 4,4'-diphenyl diisocyanate, 1,5-naphthalene diisocyanate and 1,4-naphthalene diisocyanate, aliphatic-aromatic diisocyanates such as 4,4'-diphenylmethane diisocyanate, 2,4- and 2,6-toluene diisocyanates, 4,4'-tolidine diisocyanate and 1,4-xylylene diisocyanate, nuclear-substituted aromatic isocyanates such as dianisidine diisocyanate, 4,4'-diphenyl ether diisocyanate and chlorodiphenylene diisocyanate, diphenylmethane 2,4'- and/or 4,4'-diisocyanate, 3,2'- or 3,4-diisocyanato-4-methyldiphenylmethane, triisocyanates such as triphenylmethane 4,4', 4''-triisocyanate, 1,3,5-benzene triisocyanate and 2,4,6-toluene triisocyanate, and tetraisocyanates such as 4,4'-diphenyldimethyldimethane 2,2', 5,5'-tetraisocyanate, or mixtures of these compounds.

In addition to these simple polyisocyanates, those are also suitable which contain hetero atoms in the radical linking the isocyanate groups. Examples thereof are polyisocyanates which contain carbodiimide groups, allophanate groups, isocyanurate groups, urethane groups, acylated urea groups and biuret groups.

The polyisocyanates used can also be polymerized polyisocyanates, such as the dimer of toluylene diisocyanate, the isocyanurate-containing polyisocyanate of 3-isocyanatomethyl-3,3,5-trimethylcyclohexyl isocyanate and the like, or also trimerized isocyanates such as are described, for example, in German Patent Specification No. 951,168.

Finally, suitable polyisocyanates are also the known prepolymers containing terminal isocyanate groups, such as are obtainable especially by reacting the above-mentioned simple polyisocyanates, above all diisocyanates, with less than equivalent amounts of organic compounds having at least two groups reactive with isocyanate groups or of water. The reaction product of 1 mol of trimethylolpropane with 3 mol of toluylene diisocyanate or IPDI may be mentioned here as an example. The reaction product of 1 mol of water and 3 mol of hexamethylene diisocyanate, having an NCO content of 16 to 17% by weight, can also be used here. The lastmentioned reaction product of water and hexamethylene diisocyanate is here preferred. The NCO content of the reaction product applies to a 75% by weight solution in xylene/ethylene glycol acetate. Compounds in the molecular weight range from 300 to 10,000, preferably from 400 to 6,000, which contain in total at least two amino groups and/or hydroxyl groups, are also suitable for the reaction with the polyisocyanates. In this case, the corresponding polyhydroxy compounds, for example the hydroxypolyesters, hydroxypolyethers and/or acrylate resins containing hydroxyl groups, known per se in polyurethane chemistry, are preferred. With respect to such polyhydroxy compounds, reference may be made, for example, to German Offenlegungsschrift No. 3,124,784.

In these known prepolymers, the ratio of isocyanate groups to NCO-reactive hydrogen atoms is 1.05 to 10:1, preferably 1.1 to 3:1, the hydrogen atoms preferably coming from hydroxyl groups.

In other respects, the nature and quantitative proportions of the starting materials employed in the preparation of the NCO prepolymers are preferably selected such that the NCO prepolymers have (a) a mean NCO functionality from 2 to 4, preferably from 2 to 3, and (b) a mean molecular weight from 500 to 10,000, preferably from 800 to 4,000.

Using these unblocked polyisocyanates including the above prepolymers, curing of component (A) is possible even at room temperature or slightly above. The use of catalysts is expedient in this case. For example, organic tin compounds such as dibutyl-tin dilaurate, dibutyl-tin diacetate, dibutyl-oxo-tin and in some cases even tertiary amines can be used as such catalysts. The quantity is in general between 0.001 and 10% by weight, preferably between 0.01 and 5% by weight, relative to component (A).

Partially or fully blocked polyisocyanates can also be used as the polyisocyanates. Suitable blocking agents are aliphatic, cycloaliphatic or alkylaromatic (monohydric) alcohols, for example lower aliphatic alcohols such as methyl or ethyl alcohol, the various propyl, butyl or hexyl alcohols, heptyl alcohol, octyl alcohol, nonyl alcohol or decyl alcohol, and the like, and also unsaturated alcohols such as allyl alcohol, cycloaliphatic alcohols such as cyclopentanol and cyclohexanol, alkylaromatic alcohols such as benzyl alcohol, methyl-benzyl, p-methoxybenzyl and p-nitrobenzyl alcohol, and monoethers of glycols, such as ethylene glycol monoethyl ether, ethylene glycol monobutyl ether and the like. Further blocking agents are ketoximes such as methyl ethyl ketone oxime, acetone oxime as well as longer-chain oximes having preferably up to 10 carbon atoms, such as methyl n-amyl ketoxime and dibutyl ketoxime, and also cyclohexanone oxime, CH-acidic compounds such as alkyl malonates, acetoacetates and cyanoacetates, having in each case 1 to 4 carbon atoms in the ester group, NH-acidic compounds such as caprolactam, and aminoalcohols such as diethylethanolamine. Phenol which is known as a blocking agent can be employed in those case where the reaction product is used for the production of solvent-containing surface coatings.

Of course, mixtures of the various types of polyisocyanates, explained above, can also be employed. When these (partially) blocked polyisocyanates are used, higher curing temperatures from 40° to 150° C. are necessary in most cases.

The quantity of polyisocyanate depends on the quantity of groups, reactive therewith, in component (A), in particular the OH number. Advantageously, the polyisocyanate is employed in equivalent quantities, even though an excess of polyisocyanate is not harmful in most cases. The excess polyisocyanate (and also part of that present in stoichiometric quantities) is admittedly hydrolyzed by the atmospheric humidity, (poly)amino compounds being formed which adversely affect the weathering resistance and light stability. However, if they are present, they do not interfere, since they are intercepted by the 1,3-dioxolan-2-one groups of component (A) even at low temperatures with formation of urethane groups and chain extension or further crosslinking. These urethane groups promote, inter alia, the adhesion to substrates, and they are thus desired groupings so that, according to the invention, the otherwise harmful (poly)amino compounds show a positive effect. For these reasons, the use of a polyisocyanate excess ("overcrosslinking") is, also according to the invention, not a disadvantage for the properties of the cured product, but even beneficial within certain limits, since the polyamino compounds formed by hydrolysis are converted into advantageous groups. This applies at least for as long as the "intercepting capacity" of component (A) is sufficient.

Aminoplast resins, preferably melamine resins, can also be used according to the invention as component (B), provided that they are compatible with component (A). The aminoplast resins employed according to the invention are preferably soluble in organic solvents. Examples which may be mentioned here of such aminoplast resins are amine/aldehyde resins, i.e. condensation products of aldehydes with melamine, which may subsequently be etherified with alcohols (melamine resins), urea (urea resins), acetoguanamine (acetoguanamine resins) or similar compounds (urethane resins, etc.). Preferred aldehyde condensation products of melamine are above all the melamine-methylol alkyl ethers (alkyl being especially methyl, n- and i-butyl), such as hexamethoxymethylmelamine, hexakis-(methoxymethyl)melamine, ethoxymethoxymethylmelamine, methylolmelamine methylated 6 times, monomethylolpentamethoxymethylenemelamine, dimethylol-tetramethoxymethylenemelamine, trimethylol-trimethoxymethylenemelamine and the like. Condensation products of formaldehyde and melamine should also be mentioned here, about 4 to 6 mol of formaldehyde per mol of melamine being reacted and the condensation products then being etherified with n-butanol, isobutanol or methanol. Such aminoplast resins have been described, for example, in Swiss Patent Specification No. 480,380, German Auslegeschrift No. 1,127,083 and in Wagner/Sarx, Lackkunstharze [Surface coating resins], 1971, pages 61-80. These literature references are incorporated herein by reference. Curing with component (B) can be accelerated by catalysts such as p-toluenesulfonic acid.

As the additional curing agents corresponding to component (C), if any, polycarboxylic acids and/or their anhydrides as well as phenolic resins can be employed according to the invention, it being possible for the curing to be catalyzed, for example, by p-toluenesulfonic acid in the case of the phenolic resins.

As the additional constituents (D) which may be present in the curable mixture according to the invention, the usual surface coating additives may be mentioned here—depending on the particular application—such as pigments (iron oxides, lead oxides, lead silicates, titanium dioxide, barium sulfate, zinc oxide, zinc sulfide, phthalocyanine complexes and the like), pigment pastes, antioxidants, (UV) stabilizers, leveling agents or thickeners, antifoams and/or wetting agents, reactive diluents, fillers (talc, mica, kaolin, chalk, quartz powder, asbestos powder, slate powder, various silicas, silicates and the like), catalysts, inert solvents or diluents (inter alia those mentioned under the preparation of component A) and the like. These additives can, if appropriate, be added to the mixture only just before processing.

To prepare the curable mixtures according to the invention, components (A) and (B) as well as, if appropriate, additionally (C) are mixed. In the case of components of low viscosity, this can be done in bulk, the mixture being heated to higher temperatures if necessary. Products of higher viscosity are dissolved in inert organic solvents before mixing. The inert solvents used here can in principle be the same as those also employed in the preparation of component (A) (see above), that is to say, for example, alcohols (in the case of aminoplast resins as component (B)), ketones, esters, ethers, hydrocarbons and the like.

Curing of the coatings after application to the substrate can take place in the conventional manner, for example at room temperature within a few minutes up to several days, depending on the desired degree of curing, or, after flashing off at room temperature, at temperatures from 30° to 160° C., preferably 40° to 140° C., for a correspondingly shorter time.

The cured products obtainable by means of the mixtures according to the invention are distinguished above all by the following properties:

good solvent resistance, even though only relatively small quantities of polyisocyanate are used (relatively low OH numbers);

good light stability;

good adhesive power on substrates;

low curing temperatures; frequently even room temperature or only slightly above;

high values of the (pendulum) hardness even after only short curing times.

Because of their advantageous properties, the mixtures according to the invention have versatile industrial uses, for example for the production of moldings (casting resins) or for the production of coatings. Because of the good adhesion properties and the good solvent resistance and weathering resistance, especially facings and linings of appliances, which are used in the chemical industry or outdoors, or which come into contact with motor fuels, are also possible here.

Furthermore, the mixtures according to the invention can be used as constituents of adhesives, putties and especially as constituents of paints and coating agents for coating industrial articles, domestic appliances, furniture and in the building trade and especially in the vehicle industry, for example as primers and/or topcoats, in integrated plastic/metal coatings and as vehicle refinishes.

In addition to the mixtures according to the invention (as binders), such surface coatings contain the additives conventional in the coating sector, such as pigments, pigment pastes, antioxidants, surfactants, solvents, leveling agents and wetting agents, reactive diluents, fillers and the like.

The invention is explained in more detail by the examples which follow. In these, all quantitative data relate to parts by weight, unless otherwise stated. The molecular weight $\overline{M}_W$ was determined by gel permeation chromatography (polystyrene standard).

OHN means OH number and AN means acid number.

EXAMPLES

(a) Preparation of component (A)

The monomers listed in Table 1 which follows were copolymerized in methoxypropyl acetate (=MPA). For this purpose, the solvent was initially introduced into a glass flask, the reaction vessel was evacuated and a pressure balance was established by means of nitrogen. Immediately before the start of the experiment, the initiator (ditert.-butyl peroxide) was added to the monomer mixture. The solvent was then heated to 140° C. and the particular monomer mixture was metered in within 6 hours. After the end of metering, the reaction was allowed to continue for a time at 140° C., and the solution was then adjusted in each case with MPA to 60% solids.

TABLE 1

|  | Example 1 | Example 2 | Example 3 | Example 4 |
|---|---|---|---|---|
| Solvent (MPA) | 66.66 | 66.66 | 66.66 | 66.66 |
| Styrene | 37.63 | 37.63 | 37.63 | 27.13 |
| Methyl methacrylate | 27.13 | 25.73 | 28.53 | 37.63 |
| Hydroxyethyl acrylate | 25.94 | 22.69 | 29.19 | 25.94 |
| Cyclic carbonate* | 9.30 | 13.95 | 4.65 | 9.30 |
| Initiator | 2.00 | 2.00 | 2.0 | 2.0 |

*(2-oxo-1,3-dioxolan-4-yl)-methyl methacrylate

Table 2 gives the values relating to the OH numbers, acid number and $\overline{M}_W$ of the polymers obtained (=component (A)) and the solids content of the solution.

TABLE 2

|  | Example 1 | Example 2 | Example 3 | Example 4 |
|---|---|---|---|---|
| OHN | 114 | 102 | 124 | 113 |
| AN | 3.9 | 3.6 | 3.9 | 3.5 |
| MW | 11535 | 13023 | 11356 | 12371 |
| Solids content | 60 | 60 | 60 | 60 |

(b) Preparation of the mixture according to the invention and coating (1) Component (B)=polyisocyanate Component (A) according to Example 3, dissolved in MPA, was mixed at room temperature with the polyisocyanate and also with further additives according to Table 3 which follows.

For purposes of comparison, an acrylic resin containing hydroxyl groups but no cyclic carbonate groups was employed as component (A) in comparison experiment 1.

The polymer solutions were adjusted with butylacetate to a viscosity (DIN 53211/20° C. of 50 seconds and then applied to glass plates in a wet layer thickness of 100 μm. The test results are given in Table 4.

TABLE 3

|  | According to the invention | Comparison experiment 1 |
|---|---|---|
| Acrylic resin (60% solution) (component (A)) | 82.0[1] | 82.0[2] |
| Polyisocyanate[3] (component (B)) | 33.0 | 33.0 |
| Hydroxyphenylbenzotriazole-type UV absorber ( ® Tinuvin 900, 10% in xylene) | 5.0 | 5.0 |
| Diethanolamine (100%) | 0.3 | 0.3 |
| Dibutyl-tin dilaurate (1% in xylene) | 0.2 | 0.2 |
| Butyl acetate | 6.0 | 6.0 |
| ® Solvesso 100 | 2.0 | 2.0 |
| Xylene | 3.0 | 3.0 |

[1]component (A) according to Example 3
[2]hydroxy-functional acrylic resin; MW: 12,500, OH number: 140 ( ® Macrynal SM 510n)
[3]reaction product of hexamethylene diisocyanate and water; 75% in ethylene glycol monoethyl ether-acetate ( ® Desmodur N).

TABLE 4

| (Test results) | According to the invention | Comparison experiment 1 |
|---|---|---|
| Air drying (room temperature) |  |  |
| Dry to the touch | 12 | 17 |
| Dried tack-free | 1 h | 3 h |
| Pendulum hardness |  |  |
| 2 h | 20" | sticks |
| 4 h | 28" | sticks |
| 6 h | 34" | 17" |
| 16 h | 121" | 41" |
| 24 h | 141" | 60" |
| 48 h | 187" | 121" |
| Gasoline resistance |  |  |
| 16 h | 5' | immediately |
| 24 h | 7' | 1' |
| 72 h | >30' | 10' |
| Forced drying at 60° C., 45 minutes |  |  |
| Pendulum hardness |  |  |
| 2 h | 138" | 45" |

TABLE 4-continued (Test results)

|  | According to the invention | Comparison experiment 1 |
|---|---|---|
| 24 h | 190″ | 150″ |
| Gasoline resistance |  |  |
| 2 h | 11′ | 5′ |
| 24 h | 20′ | 11′ |

Dry to the touch: according to DIN 53150 (drying stage 1)
Dried tack-free: according to DIN 53150 (drying stage 2)
Pendulum hardness: according to DIN 53157
Gasoline resistance: according to DIN 53168

(2) Component (B)=melamine resin

The procedure followed was analogous to that in (b1) but with the difference that melamine resin was used as component (B). The acrylic resins according to Examples 2, 3 and 4 were used as component (A).

For comparison purposes, a paint based on acrylic resin containing hydroxyl groups/melamine resin was used, the acrylic resin containing no cyclic carbonate groups (→ paint 4).

Table 5 below shows the composition of the respective paints.

The polymer solutions were adjusted with butyl acetate to a viscosity of 26 seconds (DIN 53211/23° C.) and then applied to glass plates in a wet layer thickness of 100 μm. The test results are given in Table 6.

TABLE 5

|  | Paint 1 | Paint 2 | Paint 3 | Paint 4* |
|---|---|---|---|---|
| Acrylic resin (component (A)) | 62.2¹ | 62.2² | 62.2³ | 52.5⁴ |
| Unplasticized methyl-etherified melamine/formaldehyde resin (70% in i-butanol; ® Maprenal MF 927) (= component b) | 22.9 | 22.9 | 22.9 | 22.9 |
| Butyl acetate | 13.9 | 13.9 | 13.9 | 22.6 |
| Hydroxyphenyltriazole-type UV absorber (® Tinuvin 900; 10% in xylene) | 0.5 | 0.5 | 0.5 | 0.5 |

*Comparison sample
¹Component (A) corresponding to Example 2;
²Component (A) corresponding to Example 3;    } solid resin content = 37.32
³Component (A) corresponding to Example 4;
⁴Mixture of 28.7 parts of a hydroxy-functional acrylic resin having a viscosity of 800 to 1400 mPas (according to DIN 53015/20° C.; diluted with xylene to 50% - ® Synthacryl SC 303; 65% in 3:1 xylene/butanol) and 24.8 parts of a hydroxy-functional acrylic resin having a viscosity of 200–300 mPas (® Synthacryl SC 370; 75% in ® Solvesso 100). Solid resin content = 37.2 parts.

TABLE 6

(Test results)

|  |  | Paint 1 (70:30) | Paint 2 (70:30) | Paint 3 (70:30) | Paint 4* (35:35:30) |
|---|---|---|---|---|---|
| (DIN 53157) |  |  |  |  |  |
| 30′/80° C. | curing | 96″ | 94″ | 86″ | tack-free |
| 30′/140° C. | conditions | 213″ | 197″ | 209″ | 169″ |
| Premium gasoline test (DIN 53168) |  |  |  |  |  |
| 30′/80° C. |  | about 1 min | about 1 min | about 1 min | about 30 sec |
| 30′/140° C. |  | 30 min | >60 min | 45 min | 3 min |
| Water test (drops on top) (DIN 53168**) |  |  |  |  |  |

TABLE 6-continued (Test results)

|  | Paint 1 (70:30) | Paint 2 (70:30) | Paint 3 (70:30) | Paint 4* (35:35:30) |
|---|---|---|---|---|
| 30′/80° C. | white tarnish | white tarnish tarnish | white tarnish | white |
|  | after 30 min | after 30 min | after 30 min | after 20 min |
| 30′/140° C. | fine blisters formed after 3 hours | fine blisters formed after 3 hours | fine blisters formed after 3 hours | fine blisters formed after 2 hour |

*Comparison sample
**Interim assessment after the time according to this Table 6

We claim:

1. A curable mixture based on
(A) compounds containing 1,3-dioxolan-2-one groups, groups capable of reacting with isocyanate groups and, if appropriate, further groups, and
(B) polyisocyanates.

2. A curable mixture as claimed in claim 1, wherein the groups capable of reaction with isocyanate groups are OH groups.

3. A curable mixture as claimed in claim 1, wherein the compounds (A) comprise structural units derived from
(a) an olefinically unsaturated monomer, containing 1,3-dioxolan-2-one groups, in a quantity from 3 to 95% by weight relative to (A),
(b) an olefinically unsaturated monomer, which is copolymerizable with (a) and contains OH groups, in quantities from 95 to 7% by weight relative to (A), and, if appropriate,
(c) one or more olefinically unsaturated monomers other than (a) and (b), which are copolymerizable with (a) and (b), in quantities of up to 90% by weight relative to (A).

4. A curable mixture as claimed in claim 3, wherein the proportion of (a) is 5 to 70% by weight and the proportion of (b) is 95 to 30% by weight.

5. A curable mixture as claimed in claim 1, wherein the 1,3-dioxolan-2-one groups are randomly distributed along the molecule chain of (A).

6. A curable mixture as claimed in claim 3, wherein the monomers according to (a) are of the formula $$H-\underset{\underset{O-(CH_2)_n-\underset{\underset{O\diagdown_C\diagup O}{|}}{C}-CH_2}{|}}{\overset{R^1}{C}}=\overset{R^2}{\underset{|}{C}}-C=O \quad R^3 \qquad (I)$$

in which n is an integer from 1 to 6, $R^1$ is H, alkyl or COOR′ (R′=H or alkyl), $R^2$ is, independently of $R^1$, H or alkyl and $R^3$ is H, methyl or ethyl.

7. A curable mixture as claimed in claim 3, wherein the monomer according to (b) is an ester, containing hydroxyl groups, of an olefinically unsaturated mono- or dicarboxylic acid having 1 to 8 carbon atoms in the alcohol radical.

8. A curable mixture as claimed in claim 3, wherein the monomer according to (c) is at least one monomer from the group comprising: (c1) vinylaromatic hydrocarbons, (c2) esters, amides or nitriles of olefinically unsaturated mono- or di-carboxylic acids, (c3) esters, capable of addition, of saturated monocarboxylic acids, (c4) olefinically unsaturated mono- or di-carboxylic acids, and, in the presence of (c3), at least an equivalent quantity of these components (c4) being present, (c5) glycidyl esters of olefinically unsaturated mono- or dicarboxylic acids and (c6) unsaturated esters of saturated monocarboxylic acids.

9. A curable mixture as claimed in claim 8, wherein the compounds (A) also contain, in addition to the structural units according to (a) and (b), those corresponding to (c1) and/or (c2).

10. A curable mixture as claimed in claim 1, wherein compound (A) is one of the following:

(2-oxo-1,3-dioxolan-4-yl)-methyl (meth)acrylate/2-hydroxyethyl (meth)acrylate/butyl (meth)acrylate/ethylhexyl (meth)acrylate;

(2-oxo-1,3-dioxolan-4-yl)-methyl (meth)acrylate/2-hydroxyethyl (meth)acrylate/butyl (meth)acrylate/ethylhexyl (meth)acrylate/styrene;

(2-oxo-1,3-dioxolan-4-yl)-methyl itaconate/2-hydroxyethyl (meth)acrylate/butyl (meth)acrylate/ethylhexyl (meth)acrylate;

(2-oxo-1,3-dioxolan-4-yl)-methyl maleate/2-hydroxyethyl (meth)acrylate/butyl (meth)acrylate/ethylhexyl (meth)acrylate;

(2-oxo-1,3-dioxolan-4-yl)-methyl (meth)acrylate/2-hydroxyethyl (meth)acrylate/methyl (meth)acrylate/styrene.

11. A curable mixture as claimed in claim 1, wherein the compounds (A) have molecular weights $\overline{M}_W$ from 1,000 to 50,000 and OH numbers from 20 to 200.

12. A curable mixture as claimed in claim 1, wherein the reaction product of 3 mol of hexamethylene diisocyanate and 1 mol of water is used as the polyisocyanate.

13. A curable mixture as claimed in claim 1, which contains, in place of polyisocyanates, aminoplast resins or mixtures thereof with polyisocyanates as component (B).

14. A curable mixture as claimed in claim 13, wherein the aminoplast resin is a melamine resin.

15. A curable mixture as claimed in claim 1, which also contains curing compounds (C) in addition.

16. A curable mixture as claimed in claim 15, wherein the curing compounds (C) are phenolic resins.

17. The use of a mixture as claimed in claim 1 for the production of moldings or coatings.

18. The use of a mixture as claimed in claim 1 as a constituent in coating agents or adhesives.

19. The use as claimed in claim 18, wherein the coating agents are vehicle topcoats or vehicle refinishes.

* * * * *